H. Ehle,
Sash Fastener.
Nº 63,787.      Patented Apr. 16, 1867.
Fig. 1.
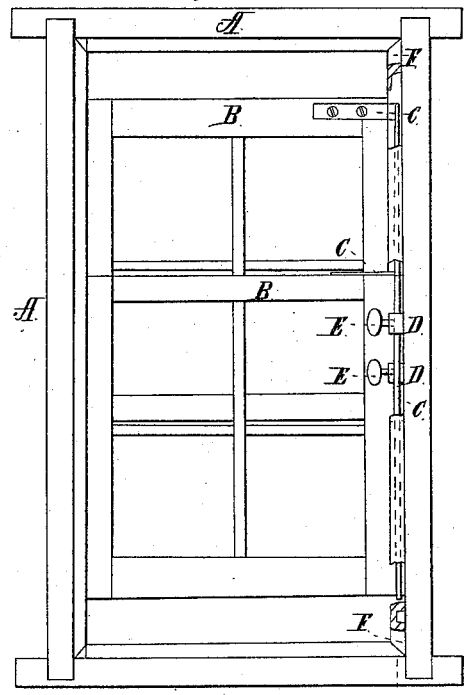
Fig. 2.    Fig. 3.
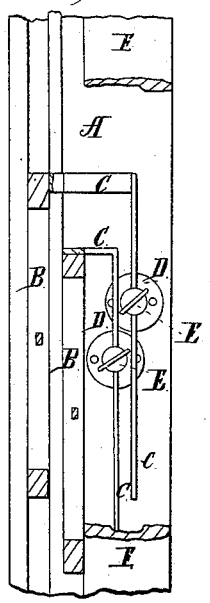 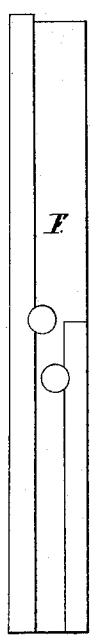
Witnesses:
Wm Ralph
Edwin Ralph
Inventor:
Herman Ehle

United States Patent Office.

HERMAN EHL, OF UTICA, NEW YORK.

Letters Patent No. 63,787, dated April 16, 1867.

---

IMPROVED SASH-SUPPORTER.

---

The Schedule referred to in these Letters Patent and making part of the same.

---

TO ALL WHOM IT MAY CONCERN:

Be it known that I, HERMAN EHL, of the city of Utica, in the county of Oneida, and State of New York, have invented a new and useful Window-Sash Supporter and Fastener; and I do hereby declare that the following is a full, clear, and exact description of the construction and operation of the same, reference being had to the annexed drawings, making a part of this specification, in which—

Figure 1 is a perspective view.

Figure 2, a longitudinal elevation.

Figure 3 the sash-stop, showing the recess in which rods move, and the openings through which pass the heads of the nuts or disks D, fig. 1 and fig. 2.

To enable those skilled in the art to make and use my invention, I will proceed to describe its construction and operation, referring to the drawings, like letters representing the same parts in the several figures.

A is the window-frame; B B the sashes; C C the supporting-bars or rods secured to the sash, from which they pass into the recess behind the inner window-stop F. D D are two metallic disks or nuts, secured firmly to the side of the frame A, behind the stop F, through which play the supporting-rods C. E E are thumb-screws, operating through said disks or nuts against the supporting-bars C, in such a manner as to fasten the sash in any position desired. The supporting-rods may be attached on the left as well as on the right side of the sash, or on both sides, and may also be attached to either or both sashes.

What I claim as my invention, and desire to secure by Letters Patent, is—

The employment and use of one or more rods or bars C, attached to the sash and operated substantially as described.

I also claim, in combination with said rods or bars C, and sash B, the nuts or disks D, and thumb-screws E, the whole being attached and operated substantially in manner described for the purpose mentioned.

HERMAN EHL.

Witnesses:
  WM. RALPH,
  EDWIN RALPH.